US011939182B2

(12) United States Patent
Waszkowski

(10) Patent No.: US 11,939,182 B2
(45) Date of Patent: Mar. 26, 2024

(54) HAND-HELD LINER REMOVAL TOOL FOR PRESSURE SENSITIVE TAPE

(71) Applicant: Eurotech Distributors, Inc., Northfield, OH (US)

(72) Inventor: Paul J. Waszkowski, Hinkley, OH (US)

(73) Assignee: Eurotech Distributors, Inc., Northfield, OH (US)

( * ) Notice: Subject to any disclaimer, the term of this patent is extended or adjusted under 35 U.S.C. 154(b) by 123 days.

(21) Appl. No.: 17/315,628

(22) Filed: May 10, 2021

(65) Prior Publication Data

US 2022/0356036 A1 Nov. 10, 2022

(51) Int. Cl.

*B65H 41/00* (2006.01)
*B25G 1/06* (2006.01)
*B25G 1/10* (2006.01)

(52) U.S. Cl.

CPC ............... *B65H 41/00* (2013.01); *B25G 1/06* (2013.01); *B25G 1/102* (2013.01); *Y10T 156/1168* (2015.01); *Y10T 156/1184* (2015.01); *Y10T 156/1961* (2015.01)

(58) Field of Classification Search

CPC .......... B65H 41/00; B25G 1/06; B25G 1/102; B32B 43/006; Y10T 156/1168; Y10T 156/1184; Y10T 156/1179; Y10T 156/1195; Y10T 156/11; Y10T 156/19

See application file for complete search history.

(56) References Cited

U.S. PATENT DOCUMENTS

| | | | | |
|---|---|---|---|---|
| 3,040,802 | A | 6/1962 | Frazer | |
| 3,107,193 | A | 10/1963 | De Neui | |
| 3,477,896 | A | 11/1969 | Townsend | |
| 4,128,452 | A | 12/1978 | Johnson | |
| 4,248,660 | A | 2/1981 | Johnson | |
| 5,022,951 | A | 6/1991 | Behlmer | |
| 6,158,493 | A | 12/2000 | Hildebrand | |
| 6,685,795 | B1 * | 2/2004 | Braun | B32B 43/006 156/719 |
| 2007/0204955 | A1 * | 9/2007 | Manners | E04G 23/006 156/763 |
| 2008/0289771 | A1 * | 11/2008 | Lauzon | A47L 1/05 156/761 |

FOREIGN PATENT DOCUMENTS

| | | | | |
|---|---|---|---|---|
| CA | 2087774 A * | 7/1994 | A47G 27/0487 |
| EP | 0383157 | 6/1990 | |

* cited by examiner

*Primary Examiner* — Galen H Hauth
*Assistant Examiner* — Alexander S Wright
(74) *Attorney, Agent, or Firm* — Robert J. Yarbrough

(57) ABSTRACT

A hand tool is provided for removing a secondary liner from a tape carrier of a two-sided adhesive tape where the opposing primary side of the tape carrier is attached to a surface. The hand tool includes a handle. One end of the handle may include a handle fulcrum depending from the handle. A plurality of sharp points together define a mathematical line. The plurality of sharp points also define point axes which together define a mathematical plane. The mathematical line is coincident with the mathematical plane. The mathematical plane defines an acute angle with respect to the handle and to the handle fulcrum.

21 Claims, 14 Drawing Sheets

HAND-HELD LINER REMOVAL TOOL FOR PRESSURE SENSITIVE TAPE

I. BACKGROUND OF THE INVENTION

A. Field of the Invention

The Invention is a hand-held tool to remove a liner protecting pressure-sensitive adhesives and tapes. While the Invention is useful for removing a liner in any circumstance, it is particularly useful for removing an exposed secondary liner from a pressure-sensitive adhesive disposed on the secondary side of a tape carrier where the opposing primary side of the tape carrier is adhered to a surface.

B. Statement of the Related Art

Two-sided tape is widely used in the assembly of manufactured objects, such as windows, electronics and automobiles. The two-sided tape comprises a tape carrier coated on both sides with a pressure-sensitive adhesive and with a liner on one or both sides covering the pressure-sensitive adhesive. As used in this document, the side of a tape carrier that will be adhered to a surface is referred to as the 'primary' side and the pressure-sensitive adhesive disposed on the primary side is the 'primary pressure-sensitive adhesive.' If present, a 'primary liner' protects the primary pressure-sensitive adhesive. The opposite side of the tape carrier is referred to in this document as the 'secondary' side of the tape carrier. The 'secondary pressure-sensitive adhesive' is disposed on the secondary side of the tape carrier and the 'secondary liner' protects the secondary pressure-sensitive adhesive.

The tape carrier of a two-sided tape is very thin compared to its length and width and may be composed of a polymer film, foam or paper. The primary liner (if present) and the secondary liner may be composed of polymer film or paper coated with a release agent. The primary or secondary liner is engineered to adhere only weakly to the primary or secondary pressure-sensitive adhesive, allowing the primary or secondary liner to be removed from the primary or secondary pressure-sensitive adhesive and hence from the tape carrier. When the primary or secondary liner is removed, the corresponding pressure-sensitive adhesive is exposed and may aggressively attach the tape carrier to any object to which the adhesive may come in contact. The primary or secondary liner prevents unintended, premature adhesion of the primary or secondary pressure-sensitive adhesive and makes possible the storage, transportation and use of the two-sided tape.

To assemble a manufactured object using two-sided tape with pressure-sensitive adhesive, an operator may manually remove the primary liner from the primary side of the carrier to expose the primary adhesive. The operator applies the exposed primary adhesive to a first surface to be joined, such as a flat surface. The primary pressure-sensitive adhesive and therefore the primary side of the carrier then is adhered to the surface. The operator then manually removes the secondary liner from the secondary side of the tape carrier, revealing the secondary pressure-sensitive adhesive. The operator then will engage a second surface to be joined to the secondary adhesive on the secondary side of the carrier, adhering the second surface to the secondary pressure-sensitive adhesive and hence to the first surface.

While the secondary liner is weakly joined to the secondary pressure-sensitive adhesive, the secondary liner nonetheless may be challenging to remove from the adhesive. Several tools have been developed to assist in separating a liner from pressure-sensitive adhesive applied to a tape or label. Most of the prior liner removal tools involve a blade or wedge that passes into the pressure-sensitive adhesive between the carrier and the liner. See, for example, U.S. Pat. No. 3,040,802 to Frazer issued May 22, 1958, which has a pointed blade against which an operator presses the end of a tape so that the point passes between the carrier and liner. Another example is U.S. Pat. No. 6,685,795 to Braun, issued Feb. 3, 2004, in which a pointed wedge presses into the adhesive between the carrier and liner. See also U.S. Pat. No. 6,158,493 to Hildebrand, issued Dec. 12, 2000, that teaches a hand-held chisel that is pressed between the liner and carrier. Similar to Hildebrand are U.S. Pat. No. 4,128,452 to Johnson issued Dec. 5, 1978 and U.S. Pat. No. 4,248,660 to Johnson issued Feb. 3, 1981. See also U.S. Pat. No. 5,022,951 to Behlmer issued Jan. 11, 1991 that teaches sliding a blade under a label to remove the label from a liner. Some prior patents combine a blade passing between the carrier and liner with a tape dispenser. See U.S. Pat. No. 3,107,193 to De Neui issued Mar. 16, 1960 and U.S. Pat. No. 3,477,896 to Townsend issued Nov. 11, 1969. All of the blade and wedge tools may damage the adhesive layer that is engaged by the blade or wedge.

EP published application 90102322.6 by Krause published Aug. 22, 1990 takes a different approach; namely, the Krause tool pushes the carrier and liner in opposite directions until the shear force exceeds the shear strength of the adhesive-to-liner bond, separating the adhesive and liner.

The prior art does not teach the liner removal tool of the Invention.

II. BRIEF DESCRIPTION OF THE INVENTION

The Invention is a hand-held tool for the removal of a secondary liner from secondary pressure-sensitive adhesive disposed on the secondary side of the tape carrier of a two-sided tape where a primary side of the tape carrier is adhered to a surface. This situation frequently occurs when using two-sided tape during product assembly in manufacturing operations. The tool of the Invention is used to peel the exposed secondary liner from the secondary pressure-sensitive adhesive without damage to either the tape carrier or to the secondary pressure-sensitive adhesive.

The tool of the Invention peels the secondary liner from the secondary pressure-sensitive adhesive at any point along the secondary liner when the width and length are substantially the same, but toward the end of the secondary liner when the width and length are substantially not the same. The tool operates by penetrating the exposed secondary liner surface using a plurality of sharp points. The operator then rotates the tool to lift the sharp points from the tape while the sharp points are secured to the secondary liner. The force applied by the plurality of sharp points to the secondary liner exceeds the peeling force to peel the secondary liner from the secondary pressure-sensitive adhesive, lifting the end of the secondary liner from the secondary pressure-sensitive adhesive. The use of the plurality of sharp points provides that the force applied by any one of the sharp points to the secondary liner is less than the force that would cause tearing of the secondary liner. While any number of sharp points is contemplated by the Invention, the minimum number believed to be effective is three sharp points while five sharp points have proven suitable in practice.

The hand tool of the invention includes a handle that may be gripped by a user. The handle defines a first end and a second end. The first end of the handle may define a handle fulcrum, which may be curved. The user may grip the handle and may slide the handle fulcrum along the surface of the exposed secondary liner of a two-sided tape where the primary side of the two-sided tape is adhered to a surface. The sharp points are attached to and supported by the handle.

Each of the sharp points defines a point axis tangent to the sharp point. The point axes in combination define a mathematical plane. The plurality of sharp points in combination define a mathematical line normal to the point axes of the sharp points, with the mathematical line defined by the sharp points coincident with the mathematical plane. The mathematical plane is substantially tangent to, but exterior to, the handle fulcrum. The geometric relationship among the sharp points and between the sharp points and the handle allow the hand tool to successfully remove the secondary liner from the secondary pressure-sensitive adhesive on the secondary side of the tape carrier without damage to the secondary pressure-sensitive adhesive or tape carrier.

The sharp points may be supported by and connected to the handle by one or more pointed members. The one or more pointed members have a curved surface. A first portion of the pointed member curved surface proximal to the sharp points defines a first pointed member radius of curvature. A second portion of the pointed member curved surface that is immediately adjacent to the first pointed member portion has a second radius of curvature. The second pointed member portion is separated from the sharp points by the first pointed member portion and the second pointed member radius of curvature is greater than the first pointed member radius of curvature.

When the user rotates the hand tool with the sharp points penetrating the liner, the curved surface of the first portion of the pointed member engages the exposed liner surface close to the sharp points. The location on the curved surface of the pointed member that touches the exposed liner surface defines a pointed member fulcrum and the hand tool defines a lever of the second class. The load moved by the lever is the resistance to peeling of the liner. The motive force for the lever is provided by the user pressing on the handle and the pointed member fulcrum provides the fulcrum about which the lever acts.

The pointed member fulcrum moves as the user rotates the hand tool and different locations on the curved surface of the pointed member touch the exposed secondary liner surface. When the first portion of the pointed member contacts the exposed secondary liner surface, the pointed member fulcrum is close to the sharp points, the radius of curvature is relatively small and the mechanical advantage of the lever is relatively large. When the user rotates the hand tool so that the second portion of the pointed member contacts the exposed secondary liner surface, the radius of curvature is relatively large, the pointed member fulcrum is farther from the sharp points, and the mechanical advantage of the lever is relatively small.

The relatively large mechanical advantage when the curved surface of the first portion of the pointed member first contacts the exposed secondary liner surface provides that a relatively large movement of the handle results in a relatively small movement of the sharp points, assisting in separating the liner from the pressure-sensitive adhesive and reducing the likelihood of tearing or delaminating the liner. The relatively small mechanical advantage when the second portion of the pointed member defines the pointed member fulcrum causes a relatively large movement of the sharp points for a relatively small movement of the handle, hastening the removal of the secondary liner from the secondary pressure-sensitive adhesive.

Alternatively, the hand tool may dispense with the handle fulcrum, in which event the mathematical plane defines an acute angle with respect to the longitudinal axis of the handle. The user may grip the handle so that the user's finger acts as the handle fulcrum. In all other respects, the hand tool without the handle fulcrum acts in the same manner as the hand tool with the handle fulcrum and described above.

The handle may be configured to be secured to one or more of the user's fingers on one hand. For example, the handle may comprise a ring defining an opening through which a user's finger may penetrate. The opening defines a ring axis generally normal to the opening. The mathematical line defined by the sharp points is substantially parallel to the ring axis. The ring may be substantially rigid. Alternatively, the ring may define a resilient or flexible strap that defines the opening through which the user's finger, or two or more fingers, may penetrate and that defines the ring axis. The outside of the ring may serve as the handle fulcrum. In all other respects, the ring embodiment operates as described above.

As an alternative, a bridge may join the sharp points proximal to the mathematical line and may define the depth to which the sharp points may penetrate the secondary liner. The bridge prevents the sharp point from penetrating the liner to a depth any greater than the limit defined by the combination of the bridge and the sharp points. The bridge assists in preventing damage to the secondary pressure-sensitive adhesive and tape carrier by the sharp points.

III. BRIEF DESCRIPTION OF THE DRAWINGS

IV. DESCRIPTION OF AN EMBODIMENT

Figure 1:
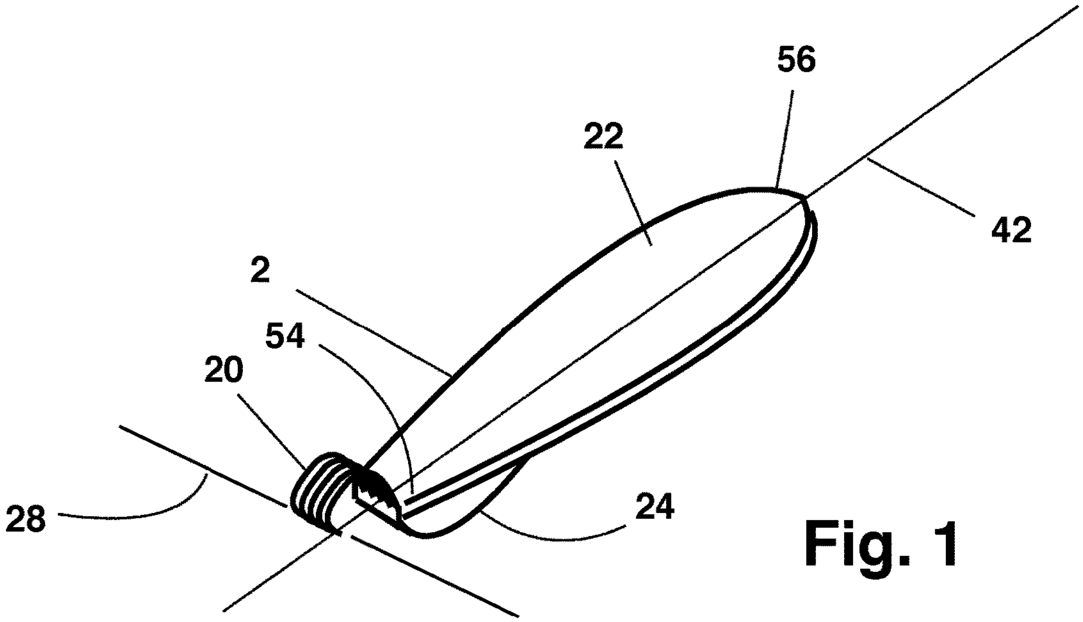
FIG. 1 is a perspective view of the hand tool of the Invention having a handle fulcrum.
Figure 2:
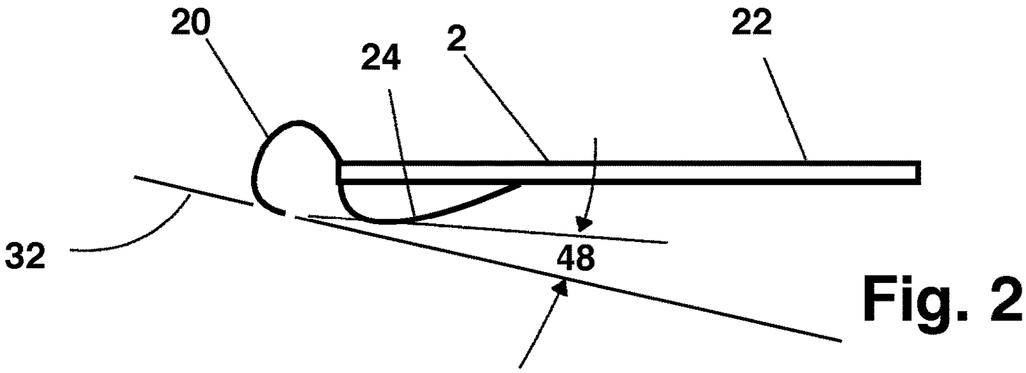
FIG. 2 is a side view of the hand tool of the Invention having a handle fulcrum.

FIGS. 1 and 2 are a perspective and a side view of a first embodiment of the hand tool 2 of the Invention. The hand tool 2 is for the removal of a secondary liner 4 from a secondary pressure-sensitive adhesive 12 on the secondary side 16 of a tape carrier 10 of a two-sided adhesive tape 6 where the primary side 14 of the tape carrier 10 is adhered to a surface 8.

Figure 3:
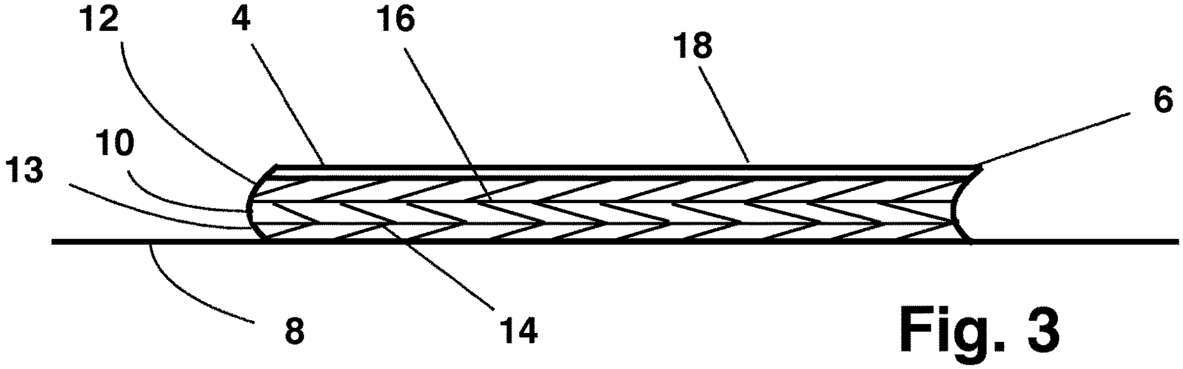
FIG. 3 is a detail side sectional view of a two-sided tape adhered to a surface.

From FIG. 3, the two-sided tape 6 comprises a tape carrier 10. A primary pressure-sensitive adhesive 13 disposed on a primary side 14 of the tape carrier 10 adheres the tape carrier 10 to the surface 8. The secondary liner 4 protects the secondary pressure sensitive adhesive 12 disposed on the secondary side 16 of the tape carrier 10 and prevents unwanted adhesion or contamination of the secondary pressure-sensitive adhesive 12.

The secondary liner 4 adheres only weakly to the secondary pressure sensitive adhesive 12. To adhere an object to the secondary pressure-sensitive adhesive 12, a user will remove the secondary liner 4 from the secondary pressure-sensitive adhesive 12 and will apply pressure between the object and the secondary pressure-sensitive adhesive 12.

FIGS. 1 and 2 show the principal components of the hand tool 2, including a plurality of pointed members 20 that are attached to a handle 22. The handle 22 includes a handle first end 54 and a handle second end 56. For the embodiment of the hand tool 2 shown by FIGS. 1 and 2, the hand tool includes a handle fulcrum 24 disposed at the handle first end 54. The plurality of pointed members 20, the handle 22 and handle fulcrum 24 are described in more detail below.

Figure 4:
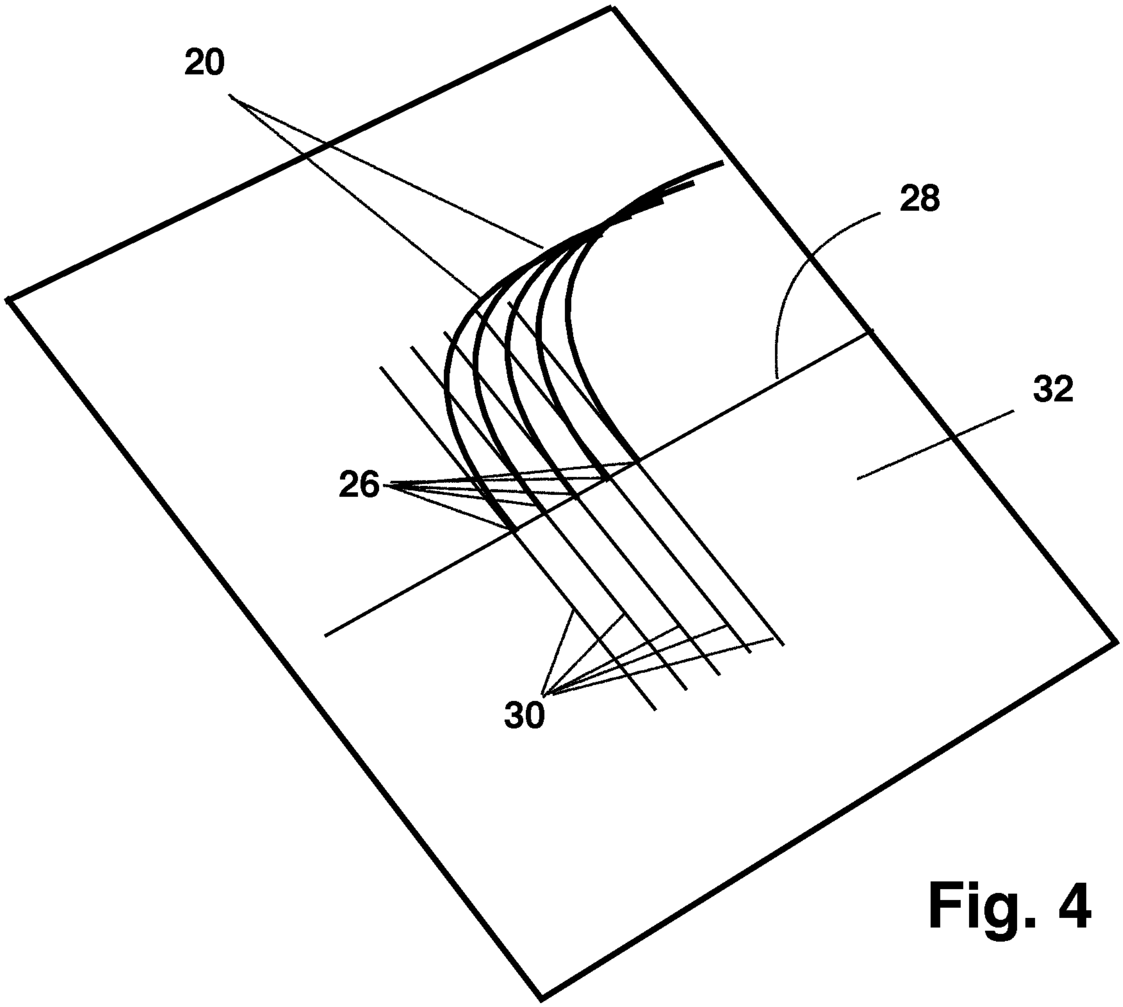
FIG. 4 is a schematic view of a plurality of pointed members.
Figure 5:
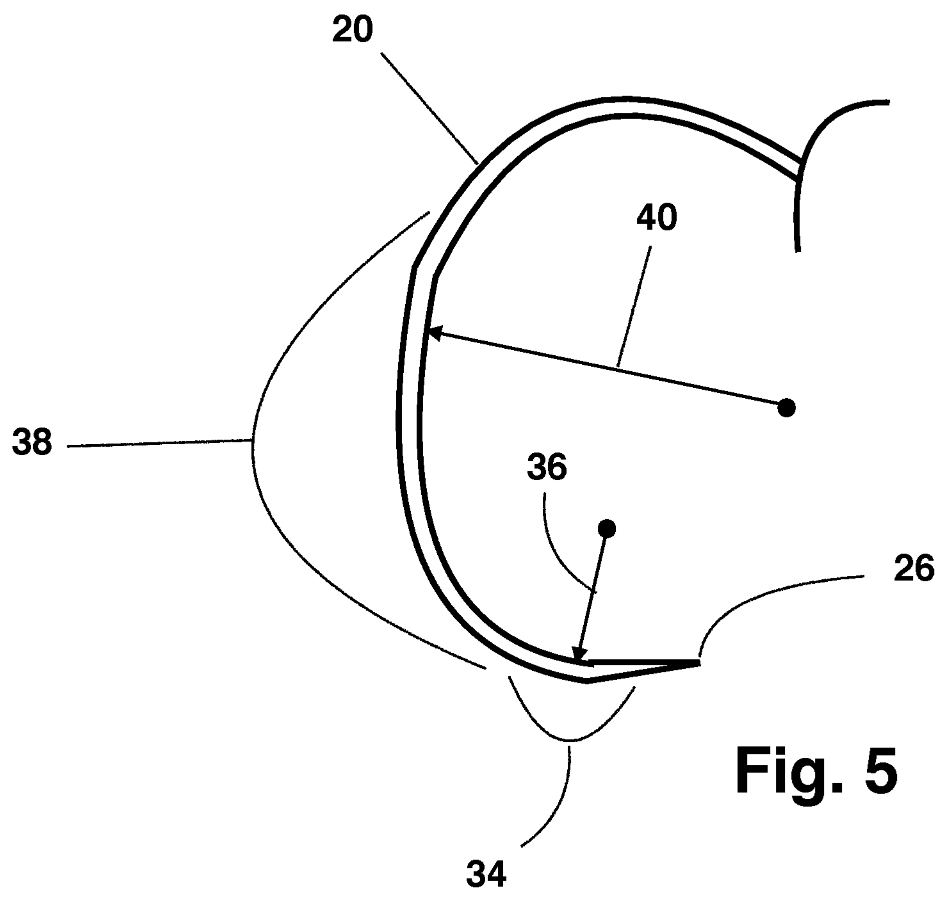
FIG. 5 is a detail side view of a pointed member.
Figure 6:
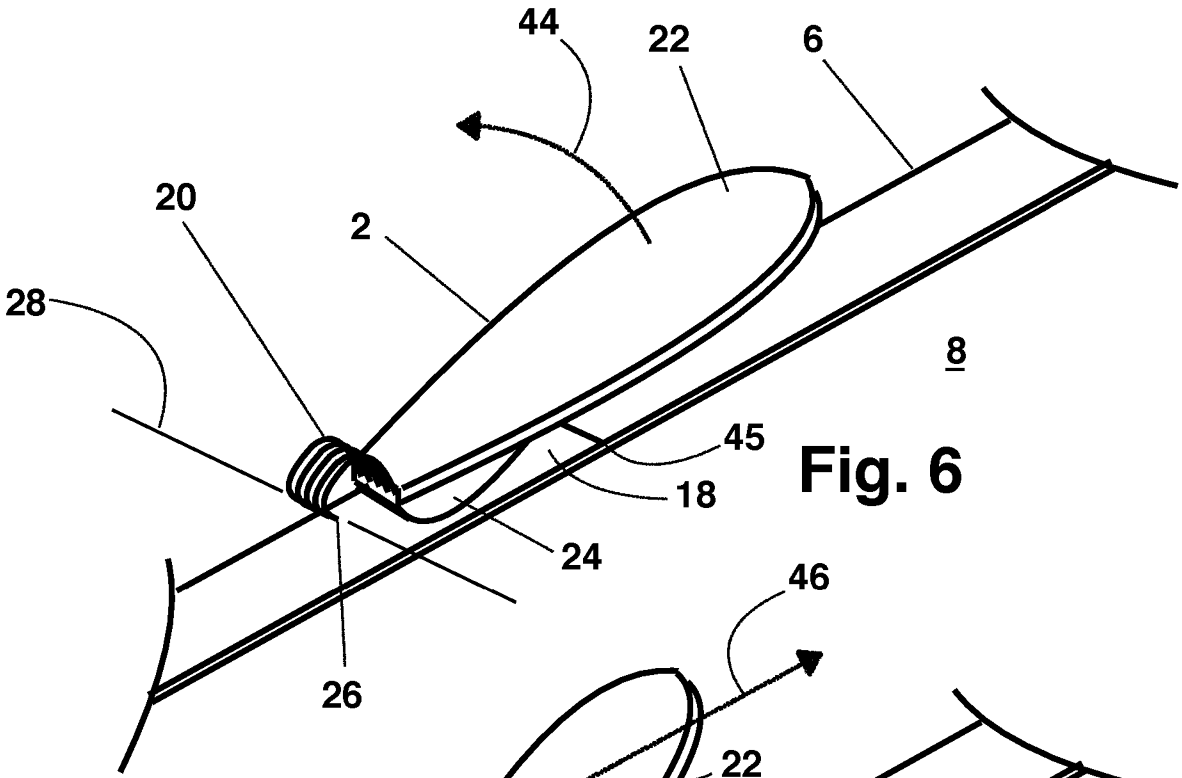
FIG. 6 is a perspective view of the hand tool on an exposed secondary liner.

FIGS. 4 and 5 show the configuration of the plurality of pointed members 20. FIG. 4 is a perspective detail view of the plurality of pointed members 20 without the handle 22 and handle fulcrum 24. Each of the pointed members 20 ends in a sharp point 26, similar to the sharp point of a sewing needle or a fish hook. FIG. 4 shows five pointed members 20. Three to five pointed members have proven suitable in practice. The sharp points 26 of the plurality of pointed members are disposed on a single mathematical line 28, shown by FIGS. 4 and 1. Each of the pointed members 20 defines a point axis 30 (shown by FIG. 4) along the longitudinal axis of the pointed member 22 at the sharp point 26. The point axes 30 of the plurality of pointed member 22 in combination define a mathematical plane 32, shown by FIG. 4 and FIG. 2. The mathematical plane 32, and hence the point axes 30, define an acute angle 48 with respect to the exposed liner surface 18 when the sharp points 26 and handle fulcrum 24 are placed in engagement with the exposed liner surface 18.

From FIG. 1, the handle 22 defines a longitudinal axis 42. The handle longitudinal axis 42, shown by FIG. 1, may be generally orthogonal to the mathematical line 28 defined by the sharp points 26.

FIG. 5 is a detail side view of a pointed member 20. A first portion 34 of the pointed member 20 is curved with a first radius of curvature 36. A second portion 38 of the pointed member 20 is curved with a second radius of curvature 40, which is larger than the first radius of curvature 36. The first portion 34 is disposed proximal to the sharp end 26. The second portion 38 is separated from the sharp point 26 by the first portion 34. The first and second portions 34, 38 of the pointed member 20 may be immediately adjacent one to the other. The second radius of curvature 40 may be large and the second portion 38 may be substantially straight.

FIGS. 6-11 show the hand tool 2 in use to remove the secondary liner 4 from a two-sided tape 6 adhered to a surface 8. From FIG. 6, to use the hand tool 2, a user will grip the hand tool 2 by the handle 22 and will place the handle fulcrum 24 in contact with the exposed secondary liner surface 18, where the primary side 14 of the tape carrier 10 is adhered to a surface 8. The user will rotate the hand tool 2 about the handle fulcrum 24 as indicated by arrow 44 so that the sharp points 26 touch the exposed secondary liner surface 18 adjacent to an end 45 of the liner 4 with the mathematical line 28 parallel to the secondary liner surface 18.

The relatively long handle 22 and the relatively short distance between the sharp points 26 and the location on the handle fulcrum 24 in contact with the secondary liner surface 18 gives the user exquisite control over the location of the sharp points 26 with respect to the secondary liner surface 18.

Figure 7:
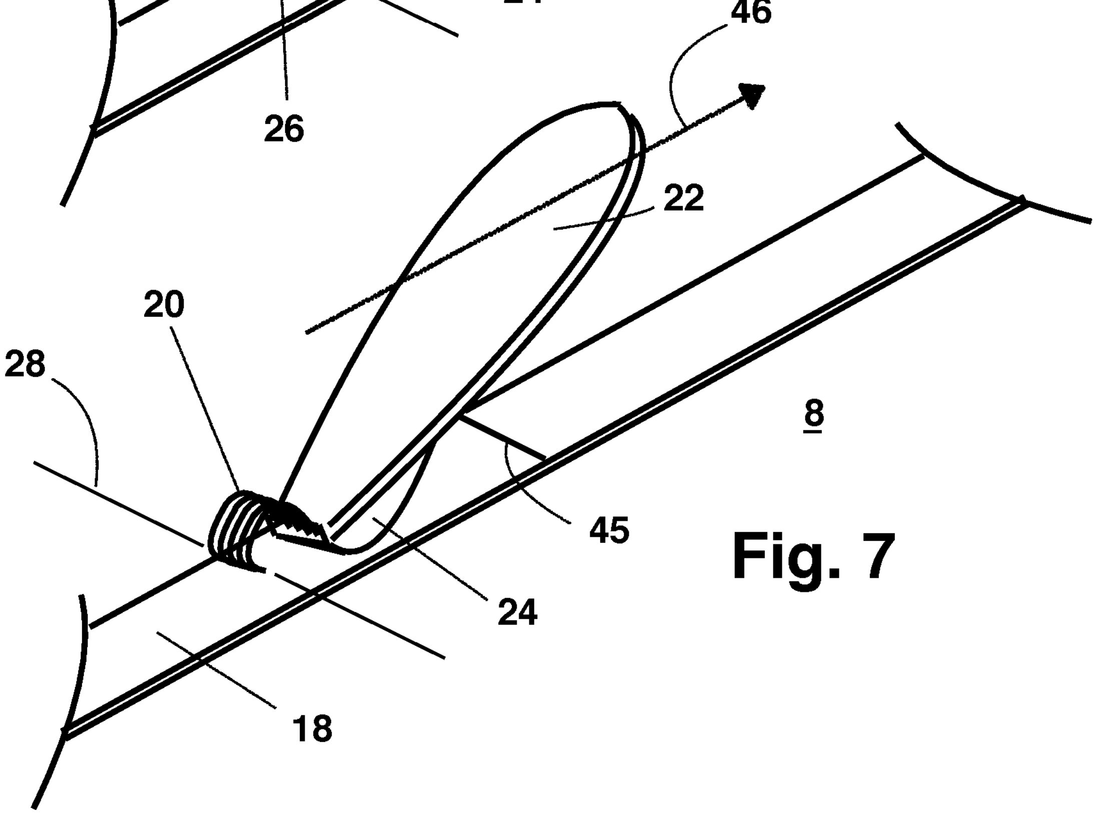
FIG. 7 is a perspective view of the hand tool with the sharp points in engagement with the secondary liner surface.
Figure 8:
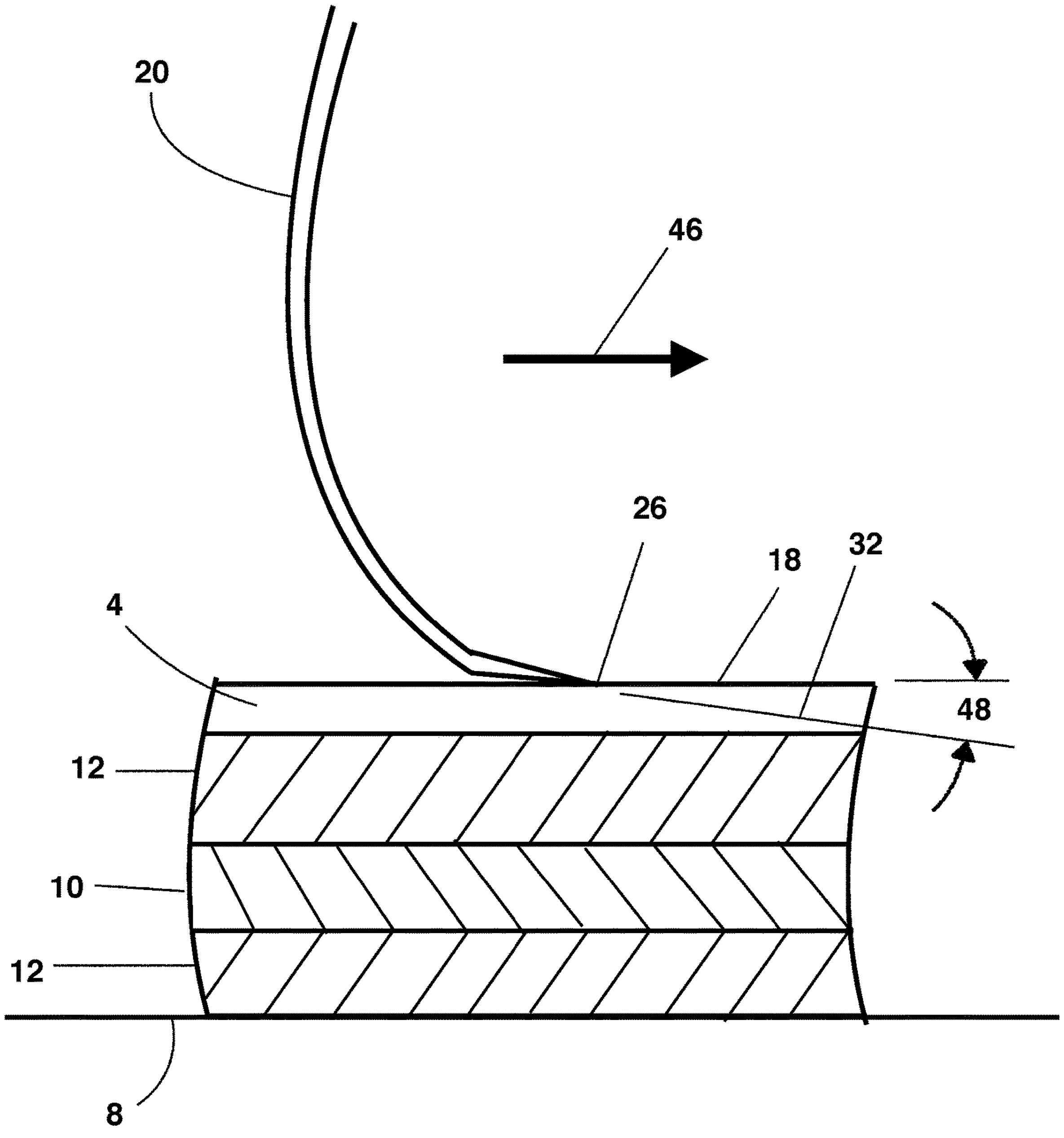
FIG. 8 is a detail side view of a pointed member in contact with the exposed secondary liner surface.
Figure 13:
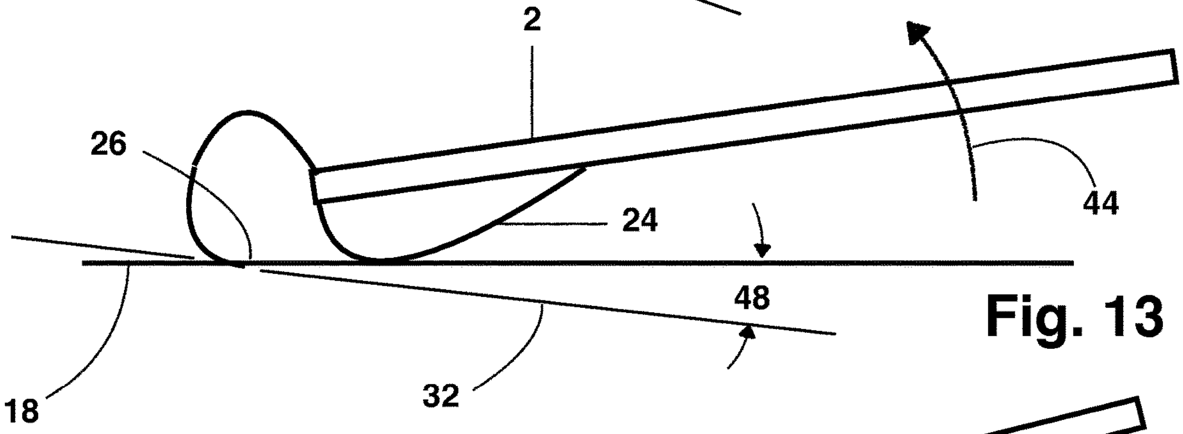
FIG. 13 is a side view of the hand tool of FIG. 12 rotated so that the sharp points contact the secondary liner.

As shown by FIGS. 7 and 8, the user will then move the hand tool 2 in the direction indicated by arrow 46 orthogonal to the mathematical line 28 and with the sharp point 26 and handle fulcrum 24 in contact with the exposed liner surface 18. FIG. 8 is a detail section side view of the two-sided tape 6 and a pointed member 20 as the user moves the tool 2 as indicated by arrow 46 with the sharp points 26 and the handle fulcrum 24 in contact with the exposed liner surface 18. As discussed below with respect to FIG. 13 and shown by FIG. 8, when the sharp points 26 and the handle fulcrum are both in contact with the surface 18 of the secondary liner 4, the mathematical plane 32 defines an acute angle 48 with respect to the surface 18 of the secondary liner 4.

Figure 9:
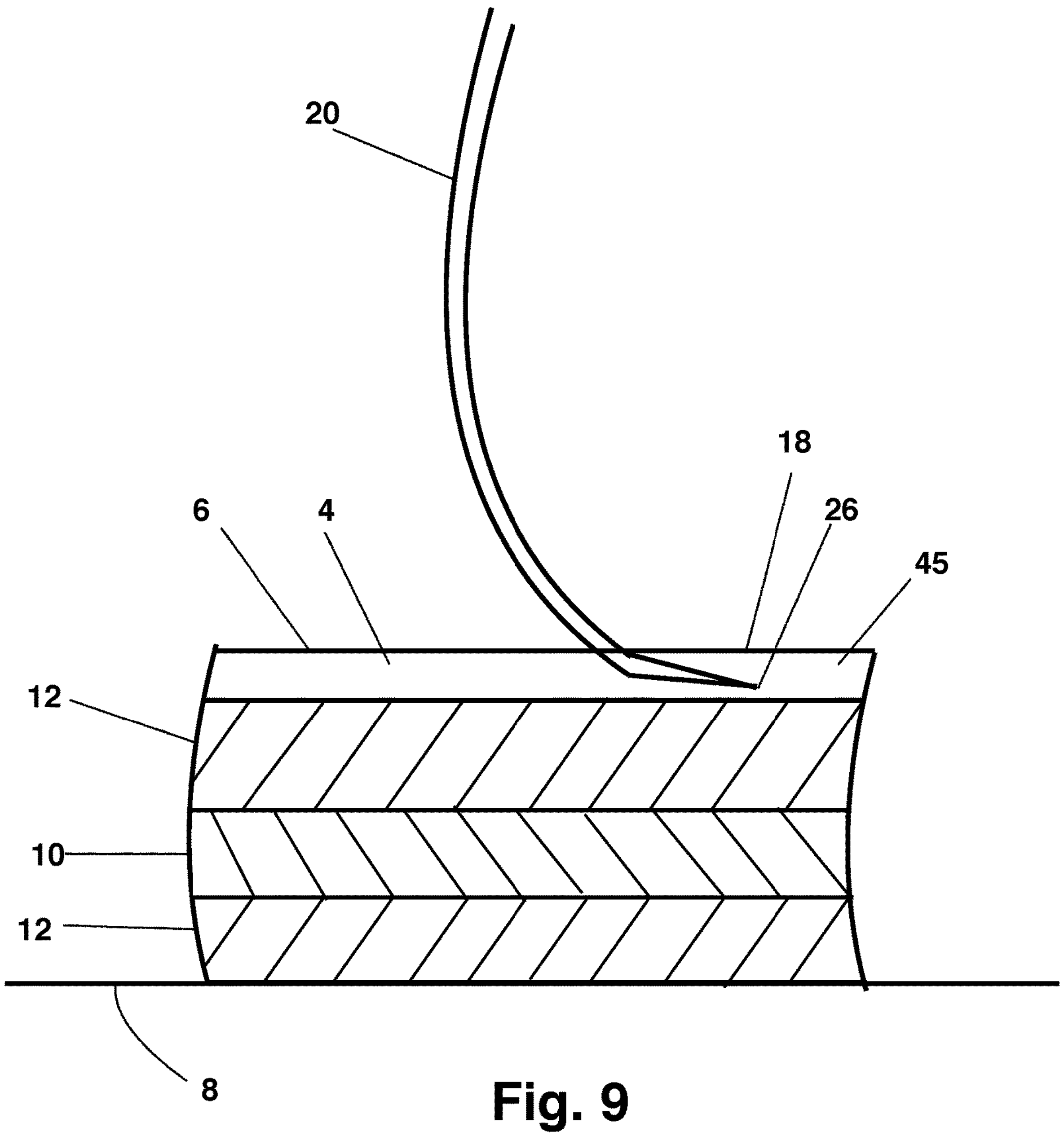
FIG. 9 is a detail side view of the sharp point penetrating the exposed secondary liner surface and secondary liner.

FIG. 9 follows FIG. 8 in sequence and shows that the sharp points 26 have breached the exposed secondary liner surface 18 and penetrated into the secondary liner 4. The secondary liner 4 generally is composed of a very thin polymer or paper. As noted, due to the long handle 22 and short distance from the sharp points 26 to the handle fulcrum 24, the user has exquisite control over the sharp points 26, including the depth to which the sharp points 26 penetrate the liner 4. As shown by FIG. 9, the user can cause the sharp points 26 to penetrate the exposed secondary liner surface 18 but not to penetrate substantially through the secondary liner 4 or into the secondary pressure-sensitive adhesive 12 or to the tape carrier 10.

Figure 10:
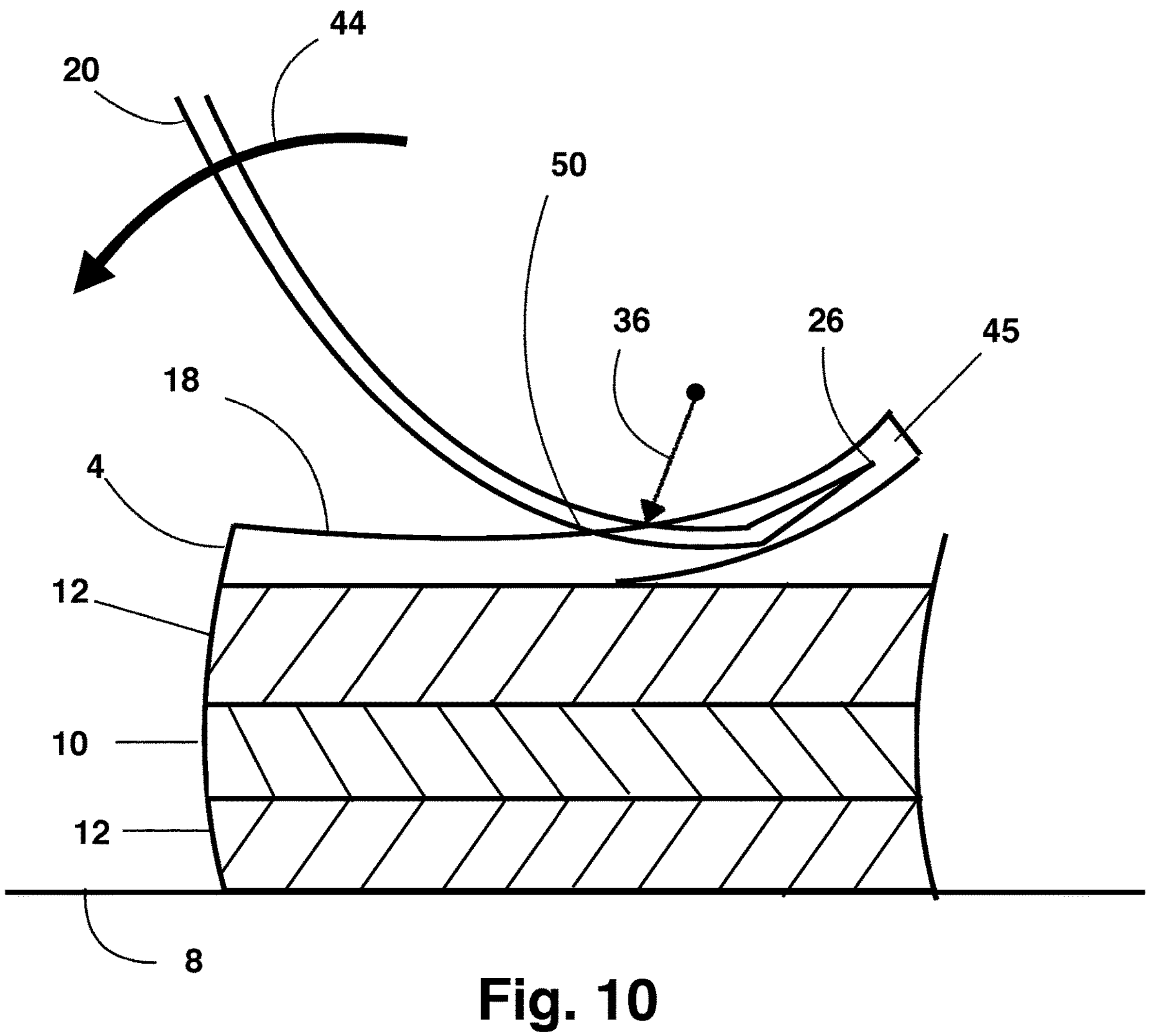
FIG. 10 is a detail side view of the pointed member rotating about the pointed member fulcrum to peel the liner from the pressure-sensitive adhesive.

FIG. 10 follows FIG. 9 in sequence and shows the beginning of peeling the secondary liner 4 from the secondary pressure sensitive adhesive 12. The user rotates the handle 22 and hence the tool 2 as indicated by arrow 44. Because of the direction of movement of the handle 22, the handle fulcrum 24 is no longer in contact with the exposed secondary liner surface 18. Instead, the hand tool 2 rotates about the pointed member fulcrum 50 defined by the first portion 34 of the pointed member 20.

Figure 11:
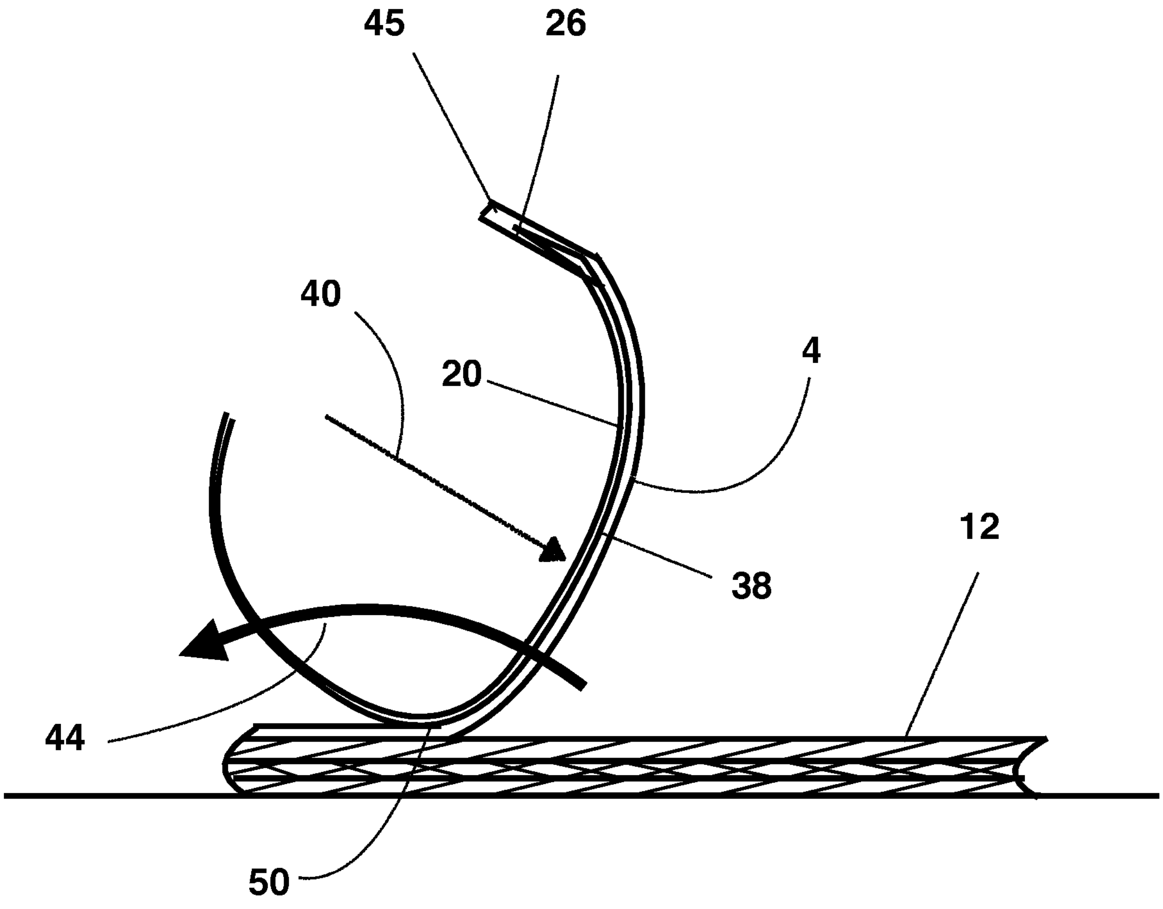
FIG. 11 is a second detail side view of the pointed member rotating about the pointed member fulcrum to peel the liner from the secondary pressure-sensitive adhesive.

FIG. 11 follows FIG. 10 in sequence and shows the accelerated peeling of the secondary liner 4 from the secondary pressure-sensitive adhesive 12 by continued rotation of the handle 22 about the pointed member fulcrum 50 defined by the second portion 38 of the pointed member 20. As noted above, the second portion 38 of the pointed member 20 has a radius of curvature 40 that is greater than the radius of curvature 36 of the first portion 34 of the pointed member 20. The user may complete the removal of the liner 4 from the secondary pressure-sensitive adhesive 12 by lifting the handle 22, and hence the end 45 of the liner 4, clear of the secondary pressure-sensitive adhesive 12 or by grasping and lifting the end 45 of the secondary liner 4 clear of the secondary pressure-sensitive tape 12.

Figure 12:
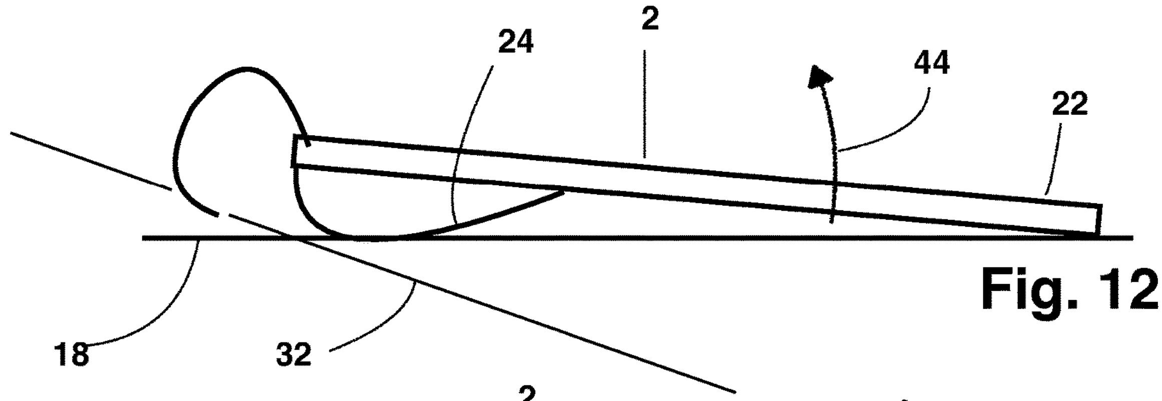
FIG. 12 is a side view of the hand tool resting on the secondary liner surface.

FIGS. 12 through 17 illustrate in sequence the use of the hand tool 2 to remove the liner 4 in side view. FIG. 12 shows the hand tool 2 at rest on the secondary liner surface 18 and corresponds to FIG. 6. From FIG. 12, the hand tool 2 is supported by the handle 22 and the handle fulcrum 24 on the exposed liner surface 8. The mathematical plane 32 defines by the point axes 30 is on the outside of the curve defined by the handle fulcrum 24, but is disposed close to the handle fulcrum 24. The result is that when the hand tool 2 is rotated about the handle fulcrum 24 shown by arrow 44 so that both the handle fulcrum 24 and the sharp points 26 touch the secondary liner surface 18 (shown by FIG. 13 and corresponding FIG. 8), the mathematical plane 32 defines an acute angle 48 with respect to the secondary liner surface 18.

Figure 14:
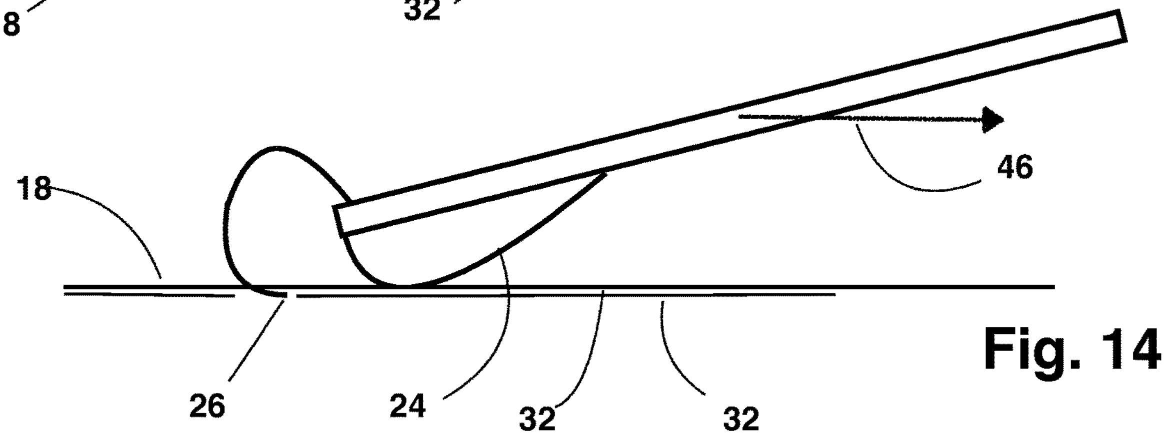
FIG. 14 is a side view of the hand tool of FIG. 4 with the sharp points engaging the secondary liner.

In FIG. 14, corresponding to FIG. 9, the user grips the handle 22 and moves the hand tool 2 as indicated by arrow 46. The sharp points 26 penetrate the exposed secondary liner surface 18, rotating the hand tool 2 so that the mathematical plane 32 is substantially parallel to the exposed liner surface 18, as shown by FIG. 14. As described above, the user has fine control over the penetration of the exposed secondary liner surface 18 by the sharp points 26.

Figure 15:
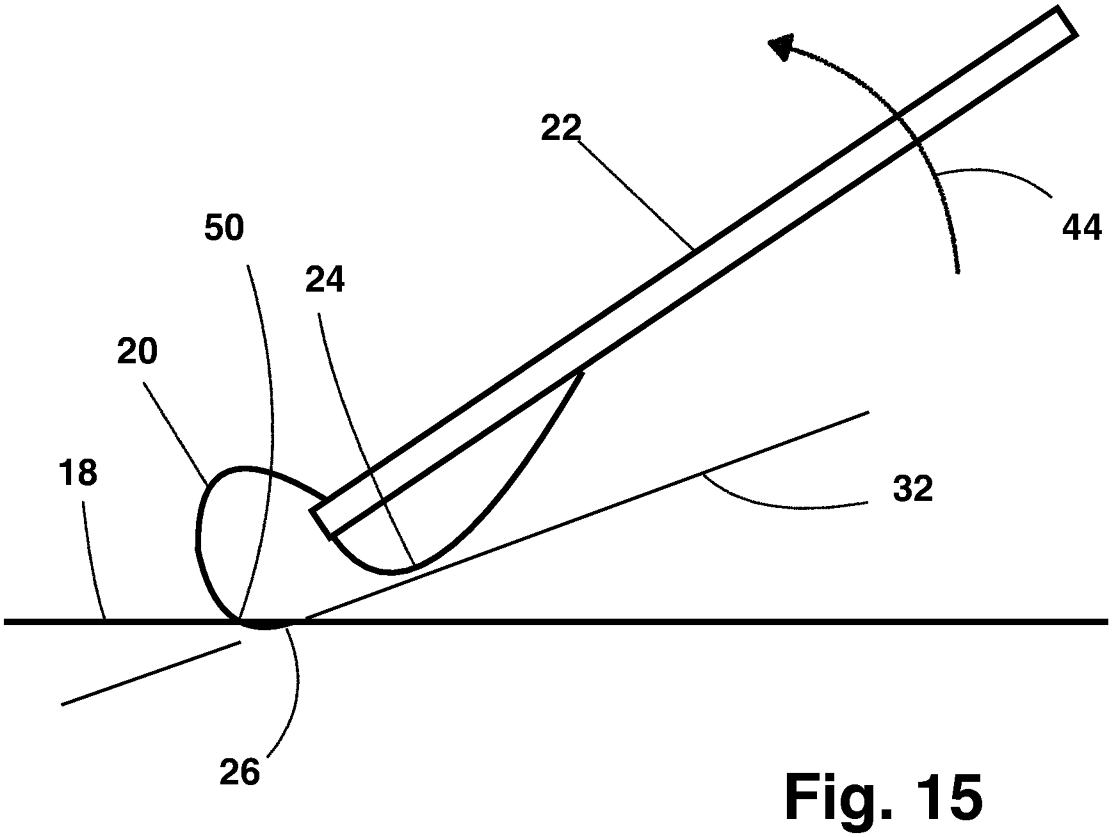
FIG. 15 is a side view of the hand tool rotated about the pointed member fulcrum.

From FIG. 15, corresponding to FIG. 10, the sharp points 26 are now imbedded in the secondary liner 4, shown by FIG. 10, and the user rotates the handle in the direction indicated by arrow 44. The hand tool 2 now rotates about pointed member fulcrum 50 defined by the first portion 34 of the pointed members 20. The pointed member fulcrum 50 bears upon the secondary liner surface 18. The handle fulcrum 24 is no longer in contact with the secondary liner surface 18. The pointed member fulcrum 50 is very close to the sharp points 26. The hand tool 2 effectively defines a lever of the second type, with the load (the resistance to motion of the sharp points 26 by the liner 4) disposed between the fulcrum (the pointed member fulcrum 50) and the lever arm (the handle 44). The second class lever provides a high mechanical advantage to peel the secondary liner 4 from the secondary pressure-sensitive adhesive 12 at the end 45 of the secondary liner 4 (shown by FIG. 10). Because the pointed member 20 includes multiple sharp points 26, the force applied by the sharp points 26 does not exceed the strength of the secondary liner 4. The secondary liner 4 does not rip, tear or delaminate and instead peels from the secondary pressure-sensitive adhesive 12 at the end 45 of the secondary liner 4.

Figure 16:
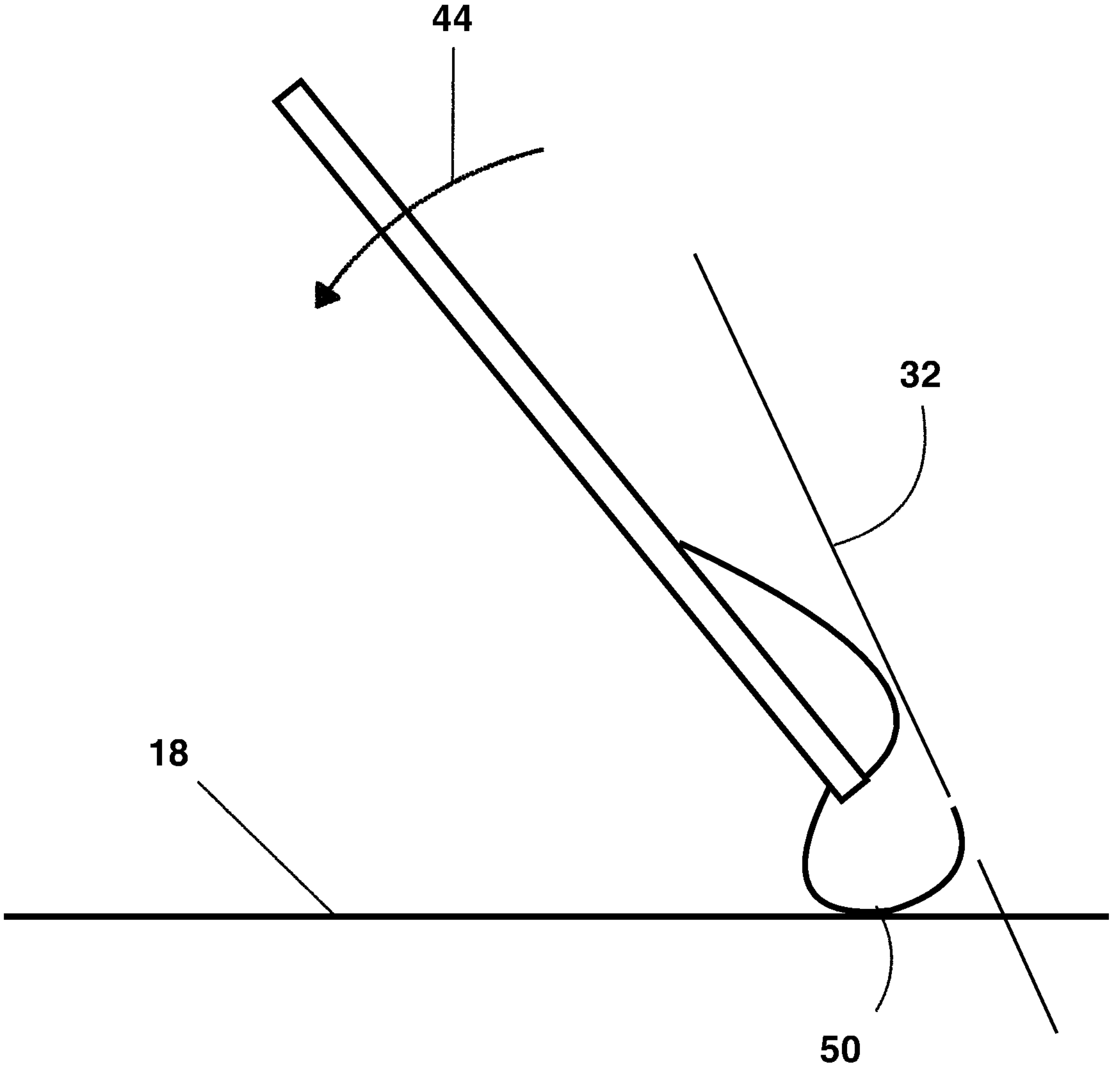
FIG. 16 is a side view of the hand tool rotated about the pointed member fulcrum further than FIG. 15.
Figure 17:
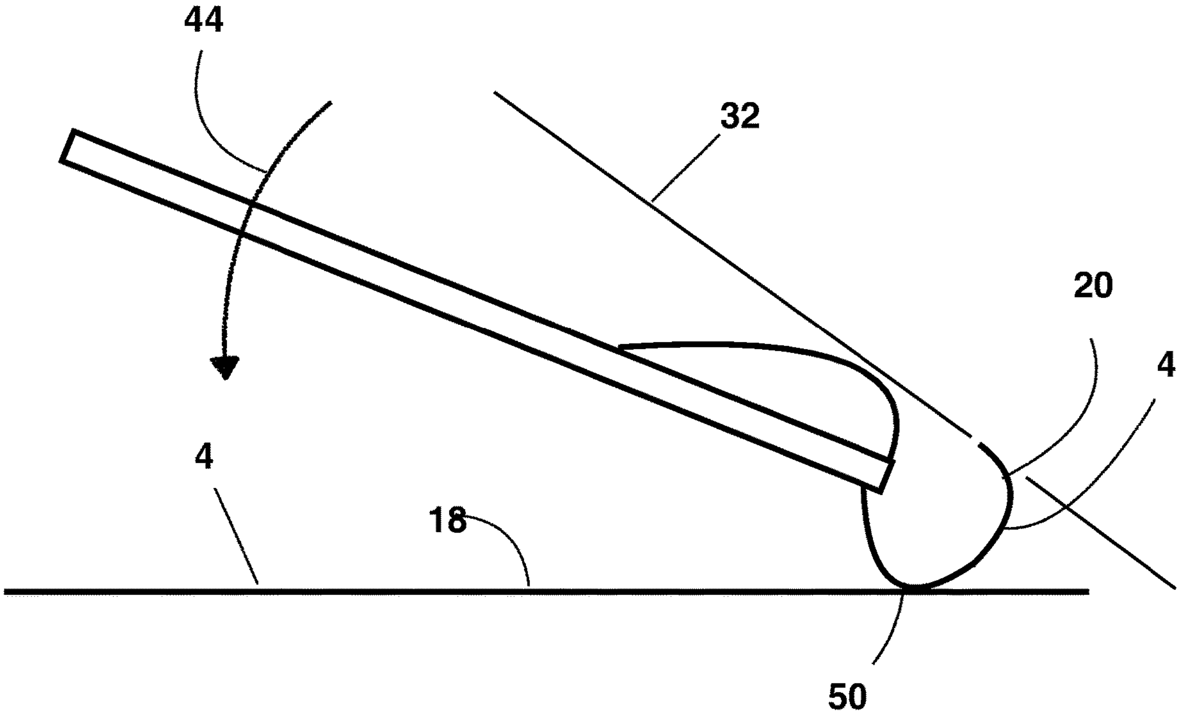
FIG. 17 is a side view of the hand tool rotated about the pointed member fulcrum farther than FIG. 16.

FIGS. 16 and 17, corresponding to FIG. 11, show the continued rotation of the hand tool 2 about the pointed member fulcrum 50. As the user rotates the hand tool 2, the secondary liner 4 wraps about the pointed member 20 (shown by FIG. 11) and the pointed member fulcrum 50 moves with the rolling pointed member 20. As the peeling of the secondary liner 4 progresses, shown by FIGS. 16 and 17. The secondary liner 4 wrapping about the pointed members 20 encounters the second portion 38 of the pointed members 20 having the second, larger, radius of curvature 40, shown by FIG. 11. The rotation of the hand tool 2 and the wrapping of the secondary liner 4 about the pointed member 20 decreases the mechanical advantage of the lever and increases the amount of secondary liner 4 freed from the secondary pressure-sensitive adhesive 12 per unit of rotation of the hand tool 2.

As shown by FIG. 17 and the corresponding FIG. 11, the end 45 (shown by FIG. 11) of the secondary liner 4 has been separated from the secondary pressure sensitive adhesive 12. The user may grip the raised end 45 of the secondary liner 4 and strip the remaining secondary liner 4 from the two-sided tape 6 by hand. Alternatively, the user may lift the hand tool 2 away from the secondary pressure-sensitive adhesive 12 to strip the remaining secondary liner 4 from the secondary pressure-sensitive adhesive 12.

While the handle fulcrum 24 is shown as being curved, the handle fulcrum 24 may be of any suitable shape, such as rectangular, triangular, a blade, or any other shape that provides a location about which to rotate the hand tool 2 on the exposed secondary liner surface 18 and which has the relationship to the mathematical plane 32 described above.

The pointed members 20 may be composed of any suitable material, for example a polymer, sheet metal or wire. The sharp points 26 may be composed of any suitable material, for example metal wire, sharpened sheet metal, or sintered carbide. Any material that can be sharp enough and strong enough to penetrate the secondary liner surface 18 and liner 4 and to pull the liner 4 from engagement with the secondary pressure-sensitive adhesive 12 is suitable for the sharp points 26.

Figure 18:
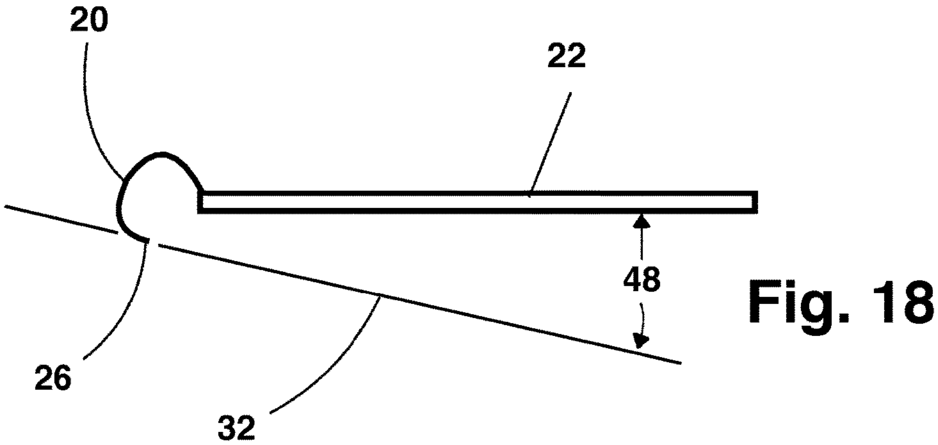
FIG. 18 is a side view of an alternative embodiment of the hand tool without the handle fulcrum.

FIG. 18 shows that the hand tool 2 may dispense with the handle fulcrum 24. The mathematical plane 32 defines an acute angle 48 with respect to the handle 22 when the handle 22 is gripped by the user. In the embodiment of FIG. 18, the user's finger may serve as the handle fulcrum 24 to control the penetration of the exposed liner surface 18 and the liner 4 by the sharp point 26. In all other respects, the embodiment of FIG. 18 operates in the same fashion as the embodiment of FIGS. 1 through 17.

Figure 19:
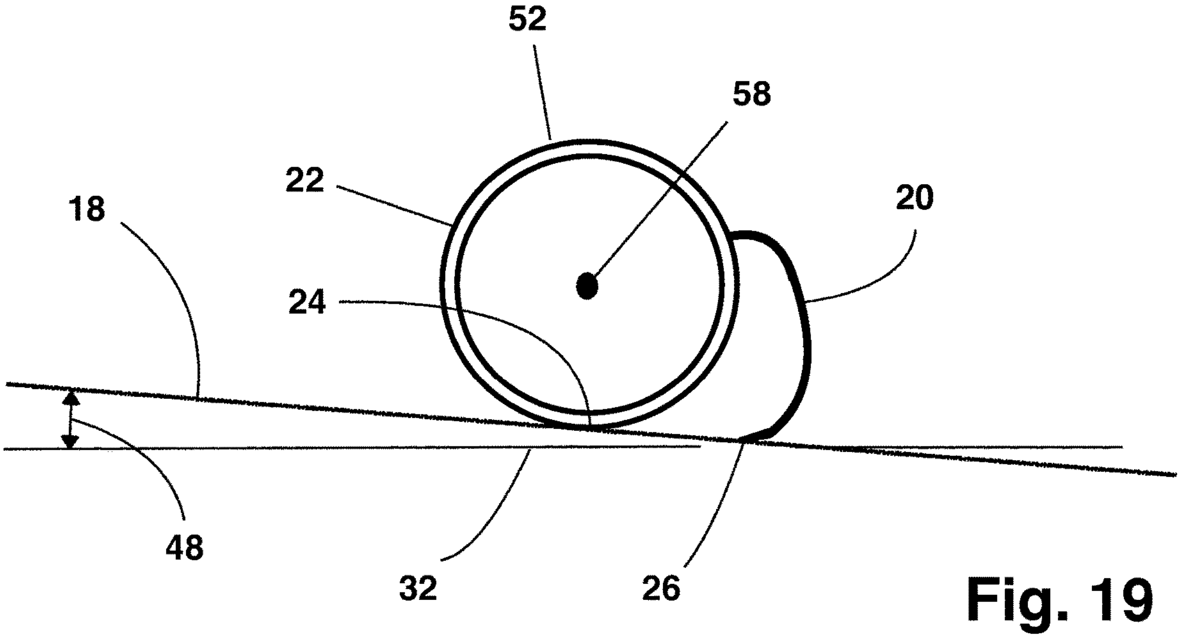
FIG. 19 is a side view of an alternative embodiment of the handle with the handle in the shape of a ring.

FIG. 19 show that the handle 22 of the hand tool 2 may define a ring 52 or loop sized to fit over one or more fingers of the user. The surface of the ring 52 adjacent to the sharp points 26 serves as the handle fulcrum 24. The mathematical plane 32 passes outside, but proximal to, the handle fulcrum 24 to define an acute angle 48 when the handle fulcrum 24 and sharp points 26 are resting on the exposed liner surface 18. The ring defines a ring axis 58 parallel to a user's finger when the finger penetrates the ring 52

Figure 20:
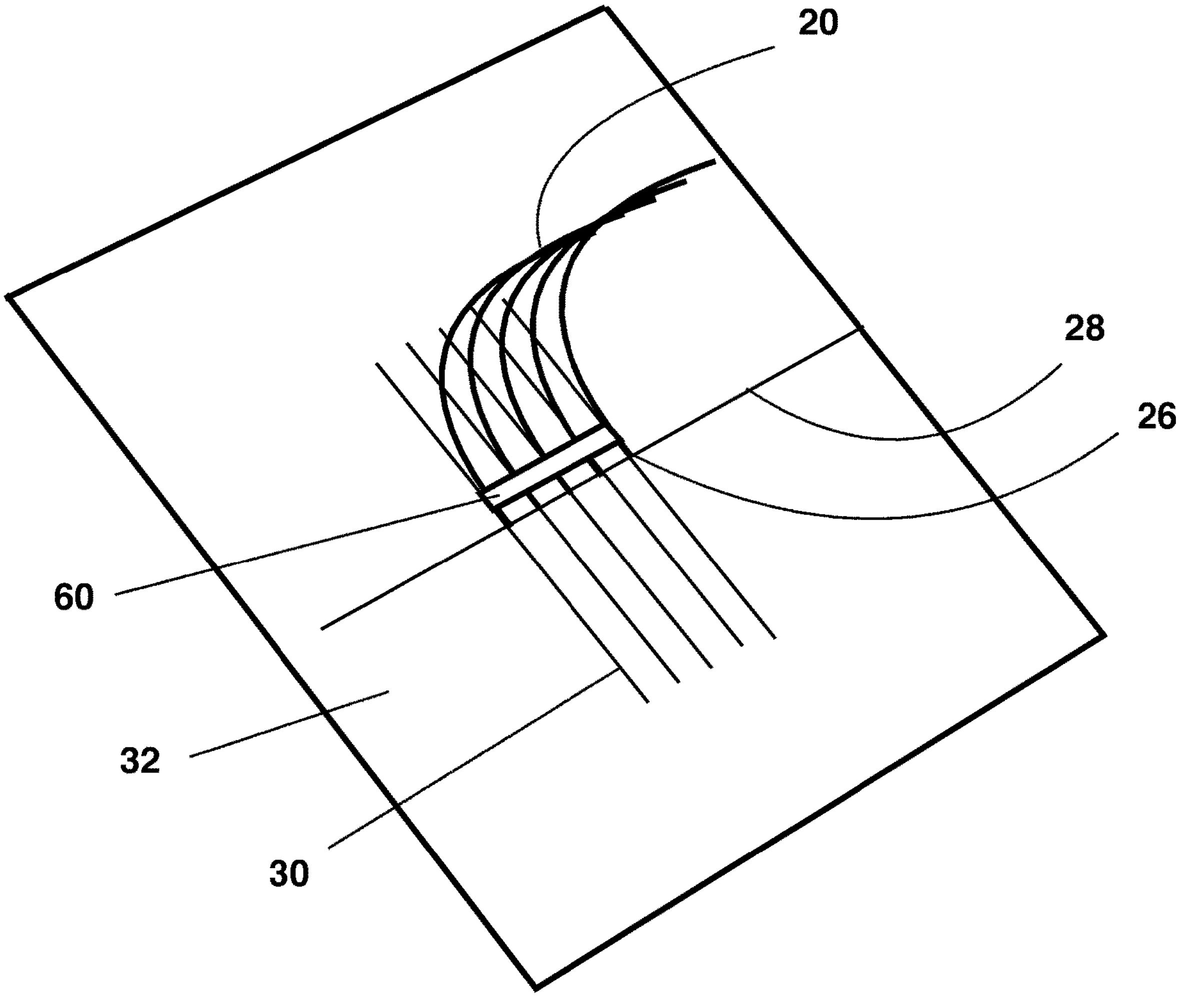
FIG. 20 is a schematic view of the plurality of pointed members showing the bridge.

FIG. 20 is a detail of the plurality of pointed member 20 similar to FIG. 4, except that FIG. 20 includes a bridge 60 that joins each of the pointed member 20 proximal to the sharp points 26, limiting the penetration of the liner 4 by the sharp points 26. The bridge 60 assists in preventing damage to the secondary pressure-sensitive adhesive 12 and to the tape carrier 10 by the hand tool 2.

The following is a list of numbered elements from the drawings and specification.

An element identified by name or number and described with respect to a figure has the same meaning when the element number is included in any other figure, unless the context requires a different meaning.

Hand tool 2
Secondary liner 4
Two-sided tape 6
Surface 8
Tape carrier 10
Secondary pressure-sensitive adhesive 12
Primary pressure sensitive adhesive 13
Primary side 14
Secondary side 16

Secondary liner surface 18
Plurality of pointed members 20
Handle 22
Handle fulcrum 24
Sharp point 26
Mathematical line 28
Point axis 30
Mathematical plane 32
First portion of the pointed member 34
First radius of curvature 36
Second portion of the pointed member 38
Second radius of curvature 40
Handle longitudinal axis 42
Arrow 44 indicating rotation of the tool
Liner end 45
Arrow 46 indicating lateral movement of the tool
Acute angle 48
Pointed member fulcrum 50
Ring 52
Handle first end 54
Handle second end 56
Ring axis 58
Bridge 60

What is claimed is:

1. A hand tool apparatus for removing a secondary liner covering a secondary pressure-sensitive adhesive, the secondary pressure-sensitive adhesive being disposed on a secondary side of a tape carrier of a two-sided tape when an opposing primary side of the tape carrier is attached to a surface, the secondary liner having an exposed secondary liner surface, the hand tool apparatus comprising:

a. a pointed member, b. a plurality of sharp points supported by the pointed member, each sharp point defining a point axis coincident with the corresponding sharp point, the point axes of the plurality of sharp points together defining a mathematical plane, the plurality of sharp points together defining a mathematical line coincident with the mathematical plane;

c. a handle attached to and supporting the pointed member, the handle being grippable by a user;

d. a handle fulcrum depending from the handle and configured for engagement with the exposed secondary liner surface, each of the sharp points being oriented substantially toward the handle fulcrum along the corresponding point axis, the mathematical plane defined by the point axes intersecting the exposed liner surface at an acute angle when the handle fulcrum and sharp points are in engagement with the exposed secondary liner surface and with the mathematical line coextensive with the exposed secondary liner surface.

2. The hand tool apparatus of claim 1 wherein the acute angle above the exposed secondary liner surface having an open side, the open side of the acute angle being oriented substantially away from the handle fulcrum.

3. The hand tool apparatus of claim 2 wherein the handle is configured for rotation about the handle fulcrum when the handle fulcrum is in engagement with the exposed secondary liner surface, the handle being rotatable from a position in which the plurality of sharp points do not engage the exposed secondary liner surface to a position in which the sharp points engage the exposed secondary liner surface with the mathematical line defined by the sharp points coincident with the exposed liner surface.

4. The hand tool apparatus of claim 3 wherein the handle fulcrum defines a curve.

5. The hand tool apparatus of claim 3 wherein the handle fulcrum does not define a curve.

6. The hand tool apparatus of claim 3, the apparatus further comprising: a pointed member fulcrum, the pointed member fulcrum and the handle fulcrum being located on opposing sides of a second mathematical plane normal to the mathematical plane defined by the point axes and with the mathematical line coextensive with the second mathematical plane, the pointed member fulcrum having a configuration so that when the user rotates the handle with respect to the exposed liner surface with the plurality of sharp points penetrating the exposed secondary liner surface, the pointed member fulcrum engages the exposed secondary liner surface.

7. The hand tool apparatus of claim 6, the configuration of the pointed member fulcrum being that the handle, pointed members and the pointed member fulcrum in combination define a second class lever, with the elongated handle defining a location at which a force is applied by the user, the sharp points penetrating the exposed secondary liner surface defining a load and the second class lever acting about the pointed member fulcrum when the pointed member fulcrum engages the exposed secondary liner surface.

8. The hand tool apparatus of claim 7 wherein the pointed member fulcrum connects the sharp points to the handle.

9. The hand tool apparatus of claim 8 wherein the pointed member fulcrum defines a pointed member fulcrum curve.

10. The hand tool apparatus of claim 9 wherein a radius of curvature defined by a first portion of the pointed member fulcrum proximal to the sharp points is less than a radius of curvature defined by a second portion of the pointed member fulcrum immediately adjacent to the first portion and distal to the sharp points, whereby a mechanical advantage of the second-class lever will reduce as the user rotates the handle against the load of the sharp points penetrating the exposed secondary liner surface.

11. The hand tool apparatus of claim 1 wherein the plurality of sharp points is more than two and less than ten sharp points.

12. A hand tool apparatus for removing a secondary liner covering a secondary pressure-sensitive adhesive, the secondary pressure-sensitive adhesive being disposed on a secondary side of a tape carrier of a two-sided tape when an opposing primary side of the tape carrier is attached to a surface, the secondary liner having an exposed secondary liner surface, the hand tool apparatus comprising:

a. a pointed member, b. a plurality of sharp points supported by the pointed member, each sharp point defining a point axis coincident with the corresponding sharp point, the point axes of the plurality of sharp points together defining a mathematical plane, the plurality of sharp points together defining a mathematical line coincident with the mathematical plane;

c. a handle attached to and supporting the pointed member, the handle being grippable by a user;

d. a handle fulcrum depending from the handle and configured for engagement with the exposed secondary liner surface, the mathematical plane defined by the point axes intersecting the exposed liner surface at an acute angle when the handle fulcrum and sharp points are in engagement with the exposed secondary liner surface and with the mathematical line coextensive with the exposed secondary liner surface, wherein the handle is configured for rotation about the handle fulcrum when the handle fulcrum is in engagement with the exposed secondary liner surface, the handle being rotatable from a position in which the plurality of sharp points do not engage the exposed secondary liner surface to a position in which the sharp points engage the exposed secondary liner surface with the mathematical line defined by the sharp points coincident with the exposed liner surface, wherein the pointed member is a one of a plurality of pointed members, the plurality of pointed members in combination defining the pointed member fulcrum, each of the plurality of pointed members corresponding to a one the plurality of sharp points.

13. A hand tool apparatus for removing a secondary liner covering a secondary pressure-sensitive adhesive, the secondary pressure-sensitive adhesive being disposed on a secondary side of a tape carrier of a two-sided tape when an opposing primary side of the tape carrier is attached to a surface, the secondary liner having an exposed secondary liner surface, the hand tool apparatus comprising:

a. a pointed member;

b. a plurality of sharp points supported by the pointed member, each sharp point defining a point axis coincident with the corresponding sharp point, the point axes of the plurality of sharp points together defining a mathematical plane, the plurality of sharp points together defining a mathematical line coincident with the mathematical plane;

b. a handle attached to and supporting the pointed member, the handle being grippable by a user, the handle being configured so that the mathematical plane defined by the point axes intersects the exposed secondary liner surface at an acute angle when the user grips the handle with the plurality of sharp points in contact with the exposed secondary liner surface and the mathematical line coincident with the exposed liner surface, wherein the handle defines a handle longitudinal axis, the handle longitudinal axis intersecting the mathematical plane defines by the point axes at the acute angle and the handle longitudinal axis being normal to the mathematical line defined by the plurality of sharp points.

14. The hand tool apparatus of claim 13 wherein the pointed member defines a pointed member fulcrum, the pointed member fulcrum having a configuration so that when the user rotates the handle with respect to the exposed secondary liner surface when the plurality of sharp points penetrate the exposed secondary liner surface, the pointed member fulcrum engages the exposed secondary liner surface.

15. The hand tool apparatus of claim 14, the configuration of the pointed member fulcrum being that the handle, pointed members and the pointed member fulcrum in combination define a lever of the second class, with the handle defining a location at which a force is applied by the user, the sharp points penetrating the exposed liner surface defining a load and the lever of the second class acting about the pointed member fulcrum.

16. The hand tool apparatus of claim 14 wherein the pointed member joins the sharp points and the handle.

17. The hand tool apparatus of claim 14 wherein the pointed member defines a pointed member curve.

18. The hand tool apparatus of claim 15 wherein a pointed member radius of curvature defined by a first portion of the pointed member proximal to the sharp points is less than a pointed member radius of curvature defined by a second portion of the pointed member immediately adjacent to the first portion and distal to the sharp points, whereby the mechanical advantage of the second-class lever will reduce as the user rotates the handle against the load of the sharp points penetrating the exposed secondary liner surface.

19. The hand tool apparatus of claim 13 wherein the plurality of sharp points is more than two and less than ten sharp points.

20. A hand tool apparatus for removing a secondary liner covering a secondary pressure-sensitive adhesive, the secondary pressure-sensitive adhesive being disposed on a secondary side of a tape carrier of a two-sided tape when an opposing primary side of the tape carrier is attached to a surface, the secondary liner having an exposed secondary liner surface, the hand tool apparatus comprising:

a. a pointed member;

b. a plurality of sharp points supported by the pointed member, each sharp point defining a point axis coincident with the corresponding sharp point, the point axes of the plurality of sharp points together defining a mathematical plane, the plurality of sharp points together defining a mathematical line coincident with the mathematical plane;

b. a handle attached to and supporting the pointed member, the handle being grippable by a user, the handle being configured so that the mathematical plane defined by the point axes intersects the exposed secondary liner surface at an acute angle when the user grips the handle with the plurality of sharp points in contact with the exposed secondary liner surface and the mathematical line coincident with the exposed liner surface, wherein the handle defines a handle longitudinal axis, the handle longitudinal axis intersecting the mathematical plane defines by the point axes at the acute angle and the handle longitudinal axis being normal to the mathematical line defined by the plurality of sharp points, wherein the pointed member is a one of a plurality of pointed members, the plurality of pointed members in combination defining the pointed member fulcrum, each of the plurality of pointed members corresponding to a one the plurality of sharp points.

21. A hand tool apparatus for removing a secondary liner covering a secondary pressure-sensitive adhesive, the secondary pressure-sensitive adhesive being disposed on a secondary side of a tape carrier of a two-sided tape when an opposing primary side of the tape carrier is attached to a surface, the secondary liner having an exposed secondary liner surface, the hand tool apparatus comprising:

a. a pointed member;

b. a plurality of sharp points supported by the pointed member, each sharp point defining a point axis coincident with the corresponding sharp point, the point axes of the plurality of sharp points together defining a mathematical plane, the plurality of sharp points together defining a mathematical line coincident with the mathematical plane;

b. a handle attached to and supporting the pointed member, the handle being grippable by a user, the handle being configured so that the mathematical plane defined by the point axes intersects the exposed secondary liner surface at an acute angle when the user grips the handle with the plurality of sharp points in contact with the exposed secondary liner surface and the mathematical line coincident with the exposed liner surface, wherein the handle defines a ring configured to receive a finger of a user, the mathematical line defined by the sharp points being parallel to the user's finger when the user's finger penetrates the ring, the ring defining the handle fulcrum, the mathematical plane being outside the ring, the mathematical plane defining an acute angle with the exposed liner surface when the handle fulcrum and sharp points are in engagement with the exposed secondary liner surface.

* * * * *